United States Patent
Chang et al.

(10) Patent No.: US 8,670,368 B2
(45) Date of Patent: Mar. 11, 2014

(54) BROADCAST RETRANSMITTING METHOD, BROADCAST RETRANSMITTING APPARATUS, REPLAY APPARATUS, AND BROADCAST RETRANSMITTING SYSTEM USING THE SAME

(75) Inventors: Yong-deok Chang, Suwon-si (KR); Jung-jin Kim, Yongin-si (KR); Sun-bum Han, Goyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 462 days.

(21) Appl. No.: 12/948,378

(22) Filed: Nov. 17, 2010

(65) Prior Publication Data
US 2011/0158154 A1     Jun. 30, 2011

(30) Foreign Application Priority Data
Dec. 28, 2009     (KR) .................. 10-2009-0131745

(51) Int. Cl.
*H04J 3/08*     (2006.01)
(52) U.S. Cl.
USPC ......................................... 370/315; 455/447
(58) Field of Classification Search
USPC ......................................... 370/315; 455/447
See application file for complete search history.

(56) References Cited

U.S. PATENT DOCUMENTS

| | | | | |
|---|---|---|---|---|
| 4,816,825 A | * | 3/1989 | Chan et al. | 370/447 |
| 4,878,228 A | * | 10/1989 | Takahashi | 375/211 |
| 2003/0013451 A1 | * | 1/2003 | Walton | 455/447 |
| 2009/0225751 A1 | * | 9/2009 | Koenck et al. | 370/389 |

* cited by examiner

*Primary Examiner* — Wanda Z Russell
(74) *Attorney, Agent, or Firm* — Sughrue Mion, PLLC (57) ABSTRACT

A broadcast retransmitting method, a broadcast retransmitting apparatus, a relay apparatus and a broadcast retransmitting system using the same, are provided. The broadcast retransmitting apparatus includes a demodulation unit which receives and demodulates a modulated broadcast, a modulation unit which modulates the demodulated broadcast, a spectrum sensing unit which detects an available band through spectrum sensing, and a control unit which retransmits the modulated broadcast to at least one surrounding apparatus. The broadcast retransmitting method includes receiving and demodulating a broadcast which has been modulated according to a first modulation method, and modulating the demodulated broadcast according to a second modulation method different from the first modulation method; detecting an available band from an idle band through spectrum sensing; and retransmitting the broadcast which has been modulated in the second modulation method to at least one surrounding apparatus using the detected available band.

23 Claims, 9 Drawing Sheets

BROADCAST RETRANSMITTING METHOD, BROADCAST RETRANSMITTING APPARATUS, REPLAY APPARATUS, AND BROADCAST RETRANSMITTING SYSTEM USING THE SAME

CROSS-REFERENCE TO RELATED APPLICATION

This application claims priority from Korean Patent Application No. 10-2009-131745, filed on Dec. 28, 2009, in the Korean Intellectual Property Office, the disclosure of which is incorporated herein by reference in its entirety.

BACKGROUND

1. Field

Aspects of the exemplary embodiments relate to a broadcast retransmitting method, a broadcast retransmitting apparatus, a relay apparatus and a broadcast retransmitting system using the same. In particular, the exemplary embodiments relate to a broadcast retransmitting method which retransmits a broadcast received at a host apparatus to surrounding apparatuses, and a broadcast retransmitting apparatus, a relay apparatus, and a broadcast retransmitting system, using the same.

2. Description of the Related Art

The rapid development of information and communication technologies contribute to the establishment of a network across a country, an industry and a home. In particular, it is common that users own at least one mobile communication device and easily exchange data with one another using the mobile communication device in a wireless manner within their homes or offices.

As the development of information and communication technologies is directly related to the development of broadcast communication technologies, users today can enjoy diverse broadcast contents provided by diverse broadcast providers, through a terrestrial broadcast, a satellite broadcast or a cable broadcast. In order to watch such a broadcast, users should generally use a device designed to receive a broadcast, such as a television or a digital multimedia broadcasting (DMB) receiver.

However, because of the widespread use of diverse communication devices, there is a necessity to find a method for allowing a communication device to re-receive a broadcast once received at a broadcast receiving apparatus from a broadcast provider and to provide the broadcast to a user, although the communication device is not designed to directly receive a broadcast.

In this case, however, a problem exists when a channel environment is limited, because an available frequency band is already saturated. In particular, the problem becomes more serious if a broadcast should be transmitted to a plurality of devices.

In order to solve such a problem relating to the lack of radio resources, a technique regarding cognitive radio (CR) may be used. The CR technique refers to a method that shares radio resources by finding unoccupied frequency channels through a temporal/spatial check on the frequency channels already allocated to a primary user, and allowing a secondary user to use the unoccupied channel without causing interference to the primary user.

It is common for users to watch a broadcast using a plurality of TVs within their homes. Also, the use of several monitors or mobile devices that can allow a user to watch a broadcast within a home has increased. In this situation, a method for a host TV to wirelessly retransmit a broadcast to the other devices, and allow them to easily receive a broadcast has been suggested. This method may be performed using wireless communication, such as a wireless LAN. However, there is a need to establish a broadcasting system which supports stable transmission, even when using a narrow bandwidth.

Since such a broadcasting system requires broadcast retransmission in a home, the problem exists when frequency bands are already saturated, so that an extra frequency band is not allocated. If a CR technique is used to find an unauthorized idle frequency band, there is still the problem that an available frequency range is not always uniform and is limited. Therefore, there is a need for a method for establishing a broadcast retransmitting system which operates more efficiently.

SUMMARY

Exemplary embodiments overcome the above disadvantages and other disadvantages not described above. However, it is understood that an exemplary embodiment is not required to overcome the disadvantages described above, and an exemplary embodiment may not overcome any of the problems described above.

Exemplary embodiments provide a broadcast retransmitting method which retransmits a broadcast received at a host device to surrounding apparatuses, a broadcast retransmitting apparatus, a relay apparatus, and a broadcast retransmitting system using the same.

According to an aspect of an exemplary embodiment, there is provided a broadcast retransmitting apparatus including: a demodulation unit which receives a broadcast which has been modulated in a first modulation method from a broadcasting station or a satellite, and demodulates the broadcast, a modulation unit which modulates the demodulated broadcast in a second modulation method, a spectrum sensing unit which detects an available band from an idle band through spectrum sensing, and a control unit which retransmits the broadcast modulated in the second modulation method to at least one surrounding apparatus using the detected available band.

The first modulation method may be standardized with respect to a broadcasting station or a satellite to transmit the broadcast. The second modulation method may be set, with respect to the surrounding apparatus, by a user, to retransmit the broadcast.

If the first modulation method is related to a single carrier transmission method, the second modulation method may be related to a multi-carrier transmission method.

If the first modulation method is set to be one of a quadrature amplitude modulation (QAM) method, a phase shift keying (PSK) method, and a vestigial side bands (VSB) method, the second modulation method may be set to be another one of the QAM method, the PSK method, and the VBS method.

The modulation unit may modulate the demodulated broadcast in the second modulation method based on a transmission environment for retransmitting the broadcast to at least one surrounding apparatus.

The broadcast retransmitting apparatus may further include a multiplexing unit which divides the broadcast, which has been modulated in the second modulation method, into at least one channel using at least one of a time division multiplexing (TDM) method, a frequency division multiplexing (FDM) method, and a code division multiplexing (CDM) method, and retransmits the broadcast to the at least one surrounding apparatus.

The first modulation method may be to modulate a broadcast with a first bit number per symbol, and the second modulation method may be to modulate a broadcast with a second bit number per symbol.

The second bit number may be determined based on at least one of a frequency bandwidth for retransmitting the broadcast, the number of surrounding apparatuses to re-receive the broadcast, and a transmission environment for retransmitting the broadcast.

According to an aspect of another exemplary embodiment, there is provided a relay apparatus which relays a broadcast which has been received by a broadcast receiving apparatus from a broadcasting station or a satellite to a surrounding apparatus, the relay apparatus including: an amplification unit which receives a broadcast which has been modulated in a first modulation method from the broadcast receiving apparatus and amplifies the broadcast, a demodulation unit which demodulates the amplified broadcast, a modulation unit which modulates the demodulated broadcast in a second modulation method, and a controller which relays the broadcast modulated in the second modulation method to at least one surrounding apparatus.

The first modulation method may be set with respect to the broadcast receiving apparatus by a user to transmit the broadcast, and the second modulation method may be set with respect to the surrounding apparatuses by a user to retransmit the broadcast.

According to an aspect of still another exemplary embodiment, there is provided a broadcast retransmitting method, including: receiving and demodulating a broadcast which has been modulated in a first modulation method, and modulating the demodulated broadcast in a second modulation method, detecting an available band from an idle band through spectrum sensing, and retransmitting the broadcast which has been modulated in the second modulation method to at least one surrounding apparatus using the detected available band.

The first modulation method may be standardized with respect to a broadcasting station or a satellite to transmit the broadcast, and the second modulation method may be set with respect to the surrounding apparatus by a user to retransmit the broadcast.

If the first modulation method is related to a single carrier transmission method, the second modulation method may be related to a multi-carrier transmission method.

If the first modulation method is set to be one of a QAM method, a PSK method, and a VSB method, the second modulation method may be set to be another one of the QAM method, the PSK method, and the VSB method.

The modulating operation may demodulate the broadcast which has been modulated in the first modulation method and modulate the broadcast in the second modulation method, based on a transmission environment for retransmitting the broadcast to at least one surrounding apparatus.

The retransmitting operation may divide the broadcast, which has been modulated in the second modulation method, into at least one channel using at least one of a TDM method, a FDM method, and a CDM method, and retransmit the broadcast to the at least one surrounding apparatus.

The first modulation method may be to modulate a broadcast with a first bit number per symbol, and the second modulation method may be to modulate a broadcast with a second bit number per symbol.

The second bit number may be determined based on at least one of a frequency bandwidth for retransmitting the broadcast, the number of surrounding apparatuses to re-receive the broadcast, and a transmission environment for retransmitting the broadcast.

According to an aspect of yet another exemplary embodiment, there is provided a broadcast retransmitting system, including: a host apparatus which receives a broadcast from a broadcasting station or a satellite, detects an available band from an idle band through spectrum sensing, and retransmits a broadcast which has been modulated in a first modulation method using the detected available band, and a surrounding apparatus which demodulates the retransmitted broadcast and provides the broadcast to a user.

The broadcast retransmitting system may further include a relay apparatus which receives a broadcast which has been modulated in the first modulation method from the host apparatus and demodulates the broadcast, modulates the demodulated broadcast in a second modulation method and relays the broadcast to the surrounding apparatus.

The broadcast retransmitting system may further include a relay apparatus which receives a broadcast which has been modulated in the first modulation method from the host apparatus, amplifies the broadcast, and relays the amplified broadcast to the surrounding apparatus.

Accordingly, a given channel environment can be used more efficiently and different signals desired by a plurality of surrounding apparatuses can be stably provided.

Additional aspects and advantages of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings in which.

DETAILED DESCRIPTION OF THE EXEMPLARY EMBODIMENTS

Hereinafter, exemplary embodiments will be described in greater detail with reference to the accompanying drawings.

In the following description, the same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

Figure 1:
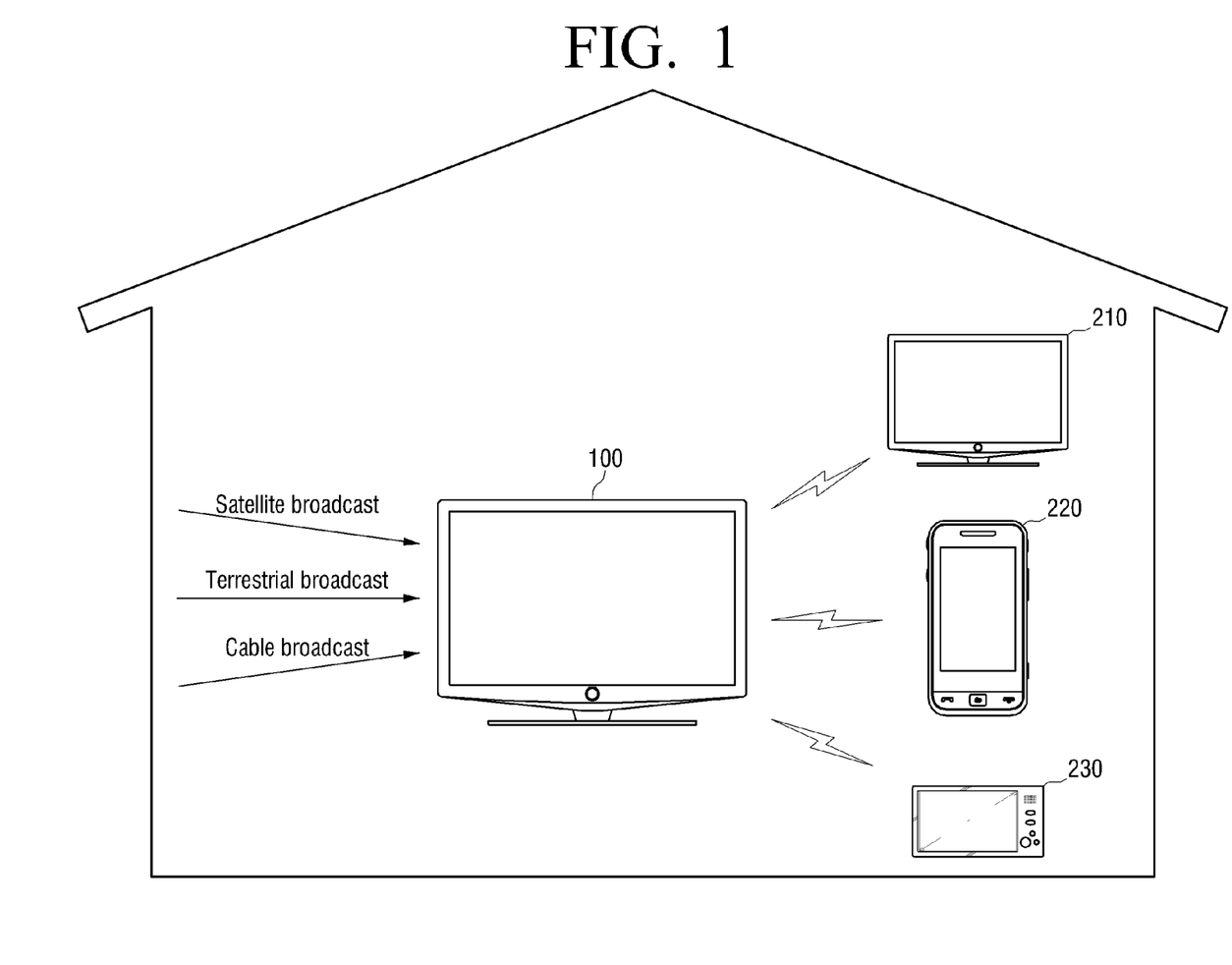
FIG. 1 is a view illustrating a home broadcasting system according to an exemplary embodiment.

FIG. 1 is a view illustrating a home broadcasting system according to an exemplary embodiment. The term "home broadcasting" recited herein refers to a broadcast retransmitting method, in which a broadcast once transmitted to a broadcast receiving apparatus in a home is retransmitted to another device, so that a user can watch the broadcast using another device. Therefore, the home broadcasting system according to an exemplary embodiment is a kind of broadcast retransmitting system.

The term "retransmitting" means that a broadcast which has been transmitted from a broadcasting station or a satellite to a device, is retransmitted to another device, rather than retransmitting a broadcast from a broadcasting station or a satellite, for the reason that the quality or state of the already transmitted broadcast is not good.

The home broadcasting system according to an exemplary embodiment includes a host apparatus to receive and retransmit a broadcast, and a surrounding apparatus to re-receive a broadcast received by the host apparatus. In this embodiment, a host TV 100 is illustrated as a kind of host apparatus, and a TV 210, a mobile phone 220, and a portable multimedia player (PMP) 230 are illustrated as a kind of surrounding apparatus.

Host TV 100 performs its original operation of receiving a broadcast from a broadcasting station or a satellite and displaying it for a user, as described above. The host TV 100 also receives a satellite broadcast, a terrestrial broadcast, or a cable broadcast and provides it to a user.

Host TV 100 retransmits the received broadcast to the surrounding apparatuses in a home. In particular, host TV 100 detects an available band from unauthorized bands through spectrum sensing on an idle band, and retransmits the received broadcast using the available band.

Host TV 100 receives a broadcast according to a modulation method already standardized with respect to a broadcasting station or a satellite and demodulates the broadcast, and modulates the demodulated broadcast according to a modulation method already standardized with respect to surrounding apparatuses and transmits it to the surrounding apparatuses. A detailed description thereof will be provided below with reference to FIGS. 2 and 3.

If a plurality of surrounding apparatuses request different broadcast signals, host TV 100 divides a modulated broadcast into a plurality of channels using one of time division multiplexing (TDM), frequency division multiplexing (FDM), and code division multiplexing (CDM), and retransmits them to the plurality of surrounding apparatuses. The TDM and the FDM will be described in detail below with reference to FIGS. 4 and 5, and the CDM will be described in detail below with reference to FIGS. 6 and 7.

As described above, the surrounding apparatuses re-receive the broadcast from host TV 100 and provide the broadcast to users who use the surrounding apparatuses.

TV 210 performs an operation of providing a broadcast retransmitted from host TV 100 to a user, in addition to an original operation of receiving a broadcast from a broadcasting station or a satellite by itself and providing it to a user. Accordingly, the users of TV 210 can watch a broadcast received at the TV 210 from a broadcasting station or a satellite, and, if it is difficult or inconvenient to do so, for example, if an antenna is not connected, the users can watch a broadcast retransmitted from host TV 210.

Mobile phone 220 performs an operation of providing a broadcast retransmitted from host TV 210 to a user in addition to an original function of communicating with a subscriber of a mobile communication net. Also, PMP 230 performs a function of providing a broadcast retransmitted from host TV 210 to a user in addition to an original function of replaying multimedia. Accordingly, the user of the mobile phone 220 or the PMP 230 can watch a broadcast received from host TV 100 in the home even if mobile phone 220 or PMP 230 does not have a function of receiving a broadcast from a broadcasting station or a satellite.

Hereinafter, a broadcast retransmitting method in which a modulation method is changed according to a standard will be described with reference to FIGS. 2 and 3.

Figure 2:
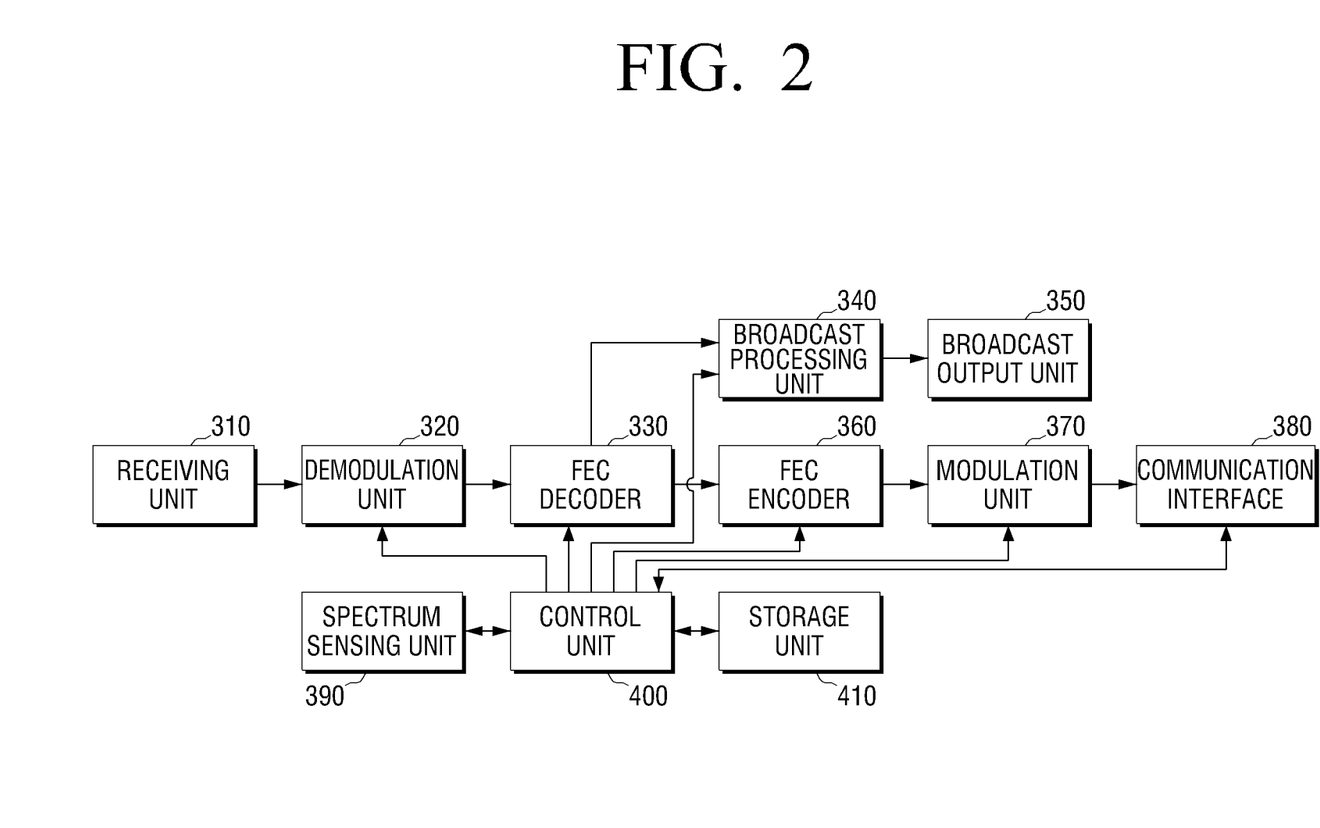
FIG. 2 is a block diagram illustrating a host TV according to an exemplary embodiment.

FIG. 2 is a block diagram illustrating a host TV 100 according to an exemplary embodiment. The host TV according to an exemplary embodiment receives a broadcast, which has been modulated according to a first modulation method, from a broadcasting station or a satellite and demodulates the broadcast, and modulates the demodulated broadcast according to a second modulation method.

Host TV 100 includes a receiving unit 310, a demodulation unit 320, a forward error correction (FEC) decoder 330, a broadcast processing unit 340, a broadcast output unit 350, a FEC encoder 360, a modulation unit 370, a communication interface 380, a spectrum sensing unit 390, a control unit 400, and a storage unit 410.

Receiving unit 310 receives a broadcast which has been modulated according to a first modulation method from a broadcasting station or a satellite. The first modulation method recited herein is a modulation method which is already standardized between a broadcasting station or a satellite and each broadcast subscriber.

For example, if a broadcast signal is a satellite signal, the first modulation method may be a pulse shift keying (PSK) method. In particular, a quadrature phase shift keying (QPSK) method which sends information using 4 phases and an 8PSK which sends information using 8 phases may be used among the PSK methods. This method is a modulation method which is already standardized with respect to satellite signals of a satellite broadcast for each country.

If a broadcast signal is a terrestrial signal, the first modulation method may be an orthogonal frequency division multiplexing (OFDM) method or a vestigial side band (VSB) method. This method is a modulation method which is already standardized with respect to a terrestrial broadcast for each country. In particular, the VSB modulation method is used in the U.S. and the OFDM modulation method is used in Europe.

The OFDM method is a modulation method according to a multi-carrier transmitting technique, which multiplexes a broadcast by dividing one piece of information into several carriers and adding orthogonality to the carriers to minimize a gap between the carriers and transmits the broadcast. In a single-carrier method, since one carrier occupies a wide frequency band, a short time is required to transmit the carrier. On the other hand, in a multi-carrier OFDM method, since there are several sub-carriers and one sub-carrier occupies a narrow frequency band, a long time is required to transmit the sub-carriers.

In the VSB method, a carrier exists at the side of a frequency band as its name indicates. The VSB modulation method is divided into an 8-VSB and a 16-VSB according to whether the amplitude of a signal is 3 bits long or 4 bits long. The 8-VSB and the 16-VSB convert an amplitude value of signal in 8 phases or 16 phases, respectively.

If a broadcast signal is a cable signal, the first modulation method may be a 64QAM or a 16-VSB.

That is, receiving unit 310 receives a broadcast which has been modulated according to a pre-defined modulation method already standardized with respect to a broadcasting station or a satellite, amplifies the broadcast, and transmits the broadcast to demodulation unit 320.

Demodulation unit 320 demodulates the broadcast to extract a transport stream, and transmits the transport stream to FEC decoder 330.

FED decoder 330 performs channel encoding and error correction with respect to the demodulated transport stream. In order to correct an error in a digital transmitting operation, a FEC redundancy bit (about 24% of 42.6 Mbit/sec) is added. FEC decoder 330 corrects an error using the FEC redundancy bit.

FEC decoder 330 transmits the decoded signal to the broadcast processing unit 340 and the FEC encoder 360.

FEC decoder 330 transmits a broadcast signal to broadcast processing unit 340 if host TV 100 serves as a general TV. That is, if host TV 100 is to provide a received broadcast to a user as its original function, FEC decoder 330 transmits a decoded broadcast signal to broadcast processing unit 340 such that broadcast processing unit 340 processes the broadcast for a user.

FEC decoder 330 transmits a broadcast signal to FEC encoder 360 if host TV 100 serves as a host apparatus. That is, if host TV 100 operates as a host apparatus to retransmit a received broadcast to an external surrounding apparatus, FEC decoder 330 transmits a decoded broadcast signal to FEC encoder 360 such that the broadcast signal is transmitted to the surrounding apparatus.

Broadcast processing unit 340 performs signal-processing with respect to the broadcast signal output from FEC decoder 330. Broadcast processing unit 340 separates a video signal, an audio signal, and additional information from the broadcast signal output from FEC decoder 330, and outputs them.

Broadcast processing unit 340 decodes the audio signal separated from the broadcast signal, thereby generating a decompressed audio signal, and converts the decoded audio signal into an audio signal of a format that can be output through a speaker. Furthermore, broadcast processing unit 340 decodes the video signal separated from the broadcast signal, thereby generating a decompressed video signal, and converts the decoded video signal into a video signal of a format that can be output through a display. To achieve this, color signal processing and scaling are performed with respect to the decoded video signal.

Broadcast processing unit 340 transmits the audio signal and the video signal of the outputtable format to broadcast output unit 350.

Broadcast output unit 350 outputs the audio signal output from broadcast processing unit 340 through a speaker or outputs it to an external display (for example, an external TV) connected through an external output terminal. Broadcast output unit 350 outputs the video signal output from broadcast processing unit 340 through a display or outputs it to an external display (for example, an external TV) connected through an external output terminal.

FEC encoder 360 adds a FEC redundancy bit to the broadcast signal in order to correct an error during a digital transmitting operation, and transmits the broadcast signal to modulation unit 370.

Modulation unit 370 modulates the broadcast signal using the second modulation method which is different from the first modulation method. For example, if the first modulation method is a single carrier QAM method, the second modulation method may be a multi-carrier OFDM PSK method.

As mentioned above, the first modulation method is a modulation method which is already standardized between a broadcasting station or a satellite and broadcast subscribers.

The second modulation method is a modulation method which is already set by a user between host TV 100 and the surrounding apparatuses. In particular, host TV 100 and the surrounding apparatuses determine what method is used as the first modulation method in advance, and sets the second modulation method different from the first modulation method.

The modulation method for the broadcast received by the host TV 100 is set to be different from the modulation method for the broadcast received by the surrounding apparatuses because several devices in the home broadcasting system should receive a broadcast at the same time and thus an interruption may occur in receiving the broadcast, probably causing an error. That is, the error is offset by setting the modulation methods differently.

Communication interface 380 communicates with the surrounding apparatuses. In particular, communication interface 380 retransmits the broadcast received from a station or a satellite to the surrounding apparatuses using an available band detected by the spectrum sensing unit 390, which will be described in detail below.

Spectrum sensing unit 390 searches for a band or a channel within a predetermined frequency range in sequence and determines whether the band or channel included in the predetermined frequency range is being currently used. In particular, spectrum sensing unit 390 searches for an available band from an idle band of a unauthorized band. Spectrum sensing unit 390 transmits information regarding the searched available band to control unit 400.

Control unit 400 controls the overall operation of host TV 100. In particular, control unit 400 controls demodulation unit 320 and modulation unit 370 to analyze a modulation method of the received broadcast and demodulate the broadcast according to the analyzed modulation method, and modulate the broadcast according to a method different from the modulation method.

Control unit 400 controls FEC decoder 330 and FEC encoder 360 to extract FEC redundancy bit from the broadcast signal to check an error or add a FEC redundancy bit to the broadcast signal.

Also, control unit 400 controls broadcast processing unit 340 to output the broadcast received by receiving unit 310 to broadcast output unit 350 and controls host TV 100 to perform its original operation.

Storage unit 410 stores diverse program information and broadcast information for operating host TV 100, and may be realized as a flash memory or a hard disk drive (HDD).

Figure 3:
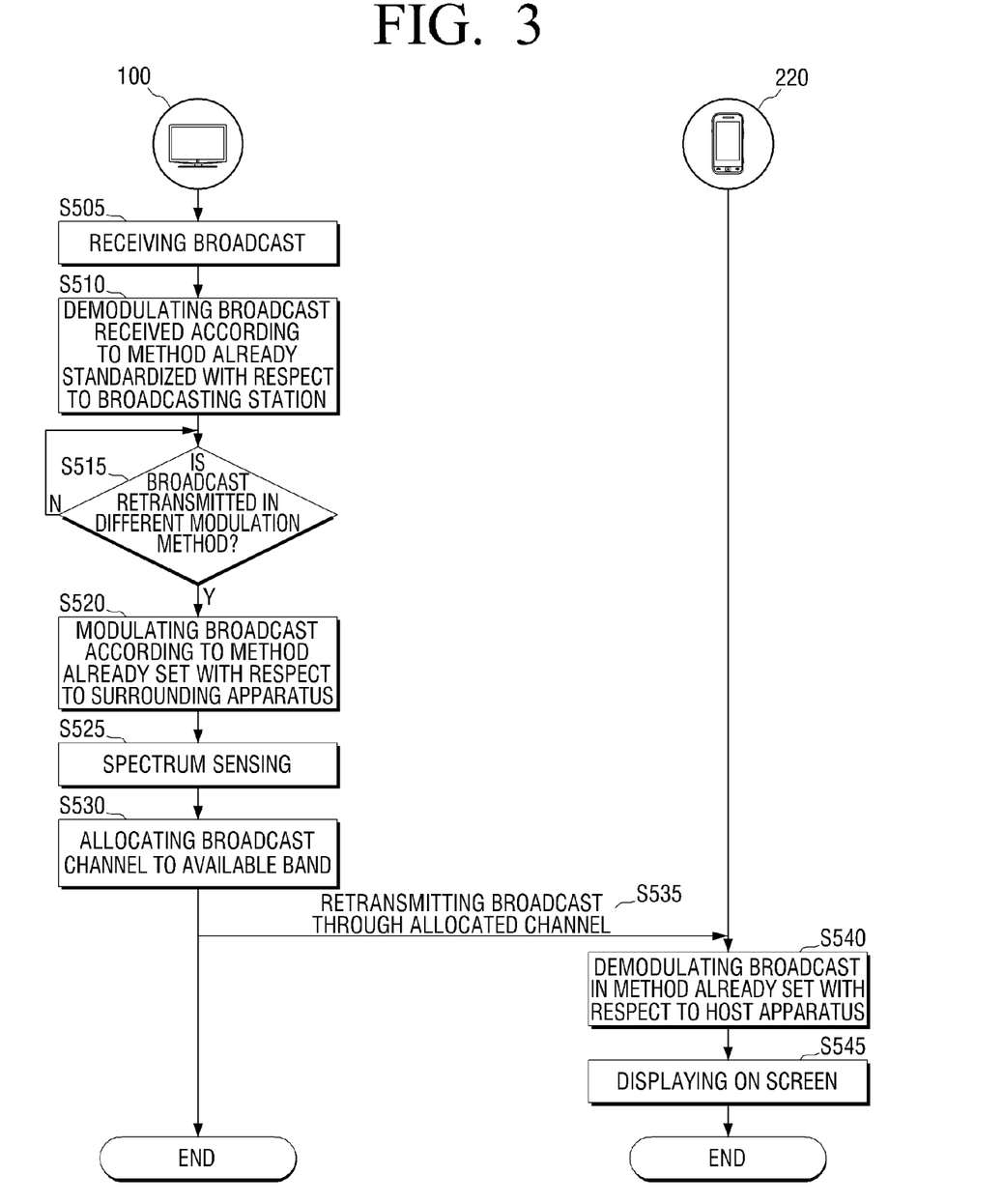
FIG. 3 is a flowchart illustrating a broadcast retransmitting method according to an exemplary embodiment.

FIG. 3 is a flowchart illustrating a broadcast retransmitting method according to an exemplary embodiment. The broadcast retransmitting method according to an exemplary embodiment receives a broadcast which has been modulated according to a first modulation method from a broadcasting station or a satellite and demodulates the broadcast, and modulates the demodulated broadcast according to a second modulation method and retransmits the broadcast to the surrounding apparatuses.

More specifically, host TV 100 receives a broadcast (S505) and demodulates the received broadcast according to a method which is already standardized and defined with respect to a broadcasting station or a satellite (S510).

Host TV 100 determines whether to modulate the broadcast in a different modulation method and retransmit it or not (S515). It may be determined whether to modulate the broadcast in a different modulation method or not according to a setting of a user. If the broadcast is determined to be retransmitted in a different modulation method (S515-Y), host TV 100 modulates the broadcast according to a method which is already set with respect to the surrounding apparatuses (S520).

Host TV 100 performs spectrum-sensing with respect to an idle band among unauthorized bands to retransmit the broadcast (S525), thereby searching for an available band. If an available band is searched for, host TV 100 allocates a broadcast channel to the available band (S530), and retransmits the modulated broadcast using the allocated channel (S535).

Mobile phone 220 receives the broadcast which is retransmitted from host TV 100, demodulates the broadcast according to a method which is already set with respect to the host apparatus (S540), and displays the broadcast on a display through a predetermined signal processing operation (S545).

Making the modulation method for the broadcast received by host TV 100, different from the modulation method for the broadcast received by the surrounding apparatuses, prevents an interruption to the surrounding apparatuses in receiving a broadcast, and reduces occurrence of an error.

Hereinafter, a method for retransmitting a broadcast to a plurality of surrounding apparatuses through multiplexing will be described with reference to FIGS. 4 and 5.

Figure 4:
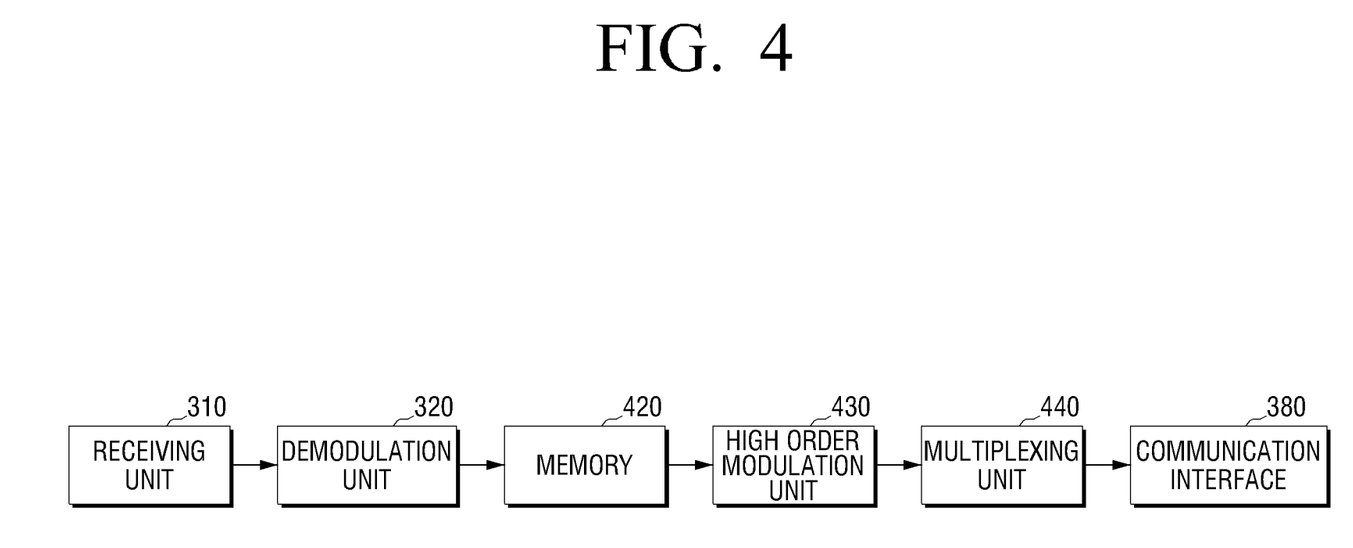
FIG. 4 is a block diagram illustrating a host TV according to another exemplary embodiment.

FIG. 4 is a block diagram illustrating a host TV 100 according to another exemplary embodiment. In particular, FIG. 4 illustrates a host TV 100 adopting a TDM or a FDM method.

Host TV 100, according to another exemplary embodiment, converts a bit rate of a broadcast received from a broadcasting station or a satellite, and multiplexes the broadcast and transmits it to surrounding apparatuses. In FIG. 4, some of components overlapping those of FIG. 2 are omitted for convenience of explanation, and only components necessary for retransmitting a broadcast received from a broadcasting station or a satellite are described.

Host TV 100 according to another exemplary embodiment includes a receiving unit 310, a demodulation unit 320, a memory 420, a high order modulation unit 430, a multiplexing unit 440, and a communication interface 380.

Receiving unit 310 receives a broadcast which has been modulated according to a first modulation method from a broadcasting station or a satellite. The first modulation method is to modulate a broadcast at a first bit rate. For example, receiving unit 310 may receive a broadcast signal which has been modulated to have 2 bits per symbol. In this case, the first bit rate corresponds to 2 bits per symbol.

Receiving unit 310 receives the broadcast which has been modulated at the first bit rate, amplifies the broadcast and transmits it to demodulation unit 320.

Demodulation unit 320 demodulates the transmitted broadcast to extract a transport stream and stores the extracted transport stream in memory 420.

High order modulation unit 430 extracts the transport stream from memory 420 and modulates it in a second modulation method which is different from the first modulation method.

The second modulation method is to modulate a broadcast at a second bit rate, which is calculated based on a frequency band for retransmitting a broadcast and the first bit rate.

For example, if a frequency band used to transmit a broadcast to host TV 100 from a broadcasting station or a satellite has a bandwidth "A," the first bit rate is 2 bits per symbol, and a frequency band for retransmitting a broadcast has a bandwidth "A/2," the second bit rate is set to be 4 bits per symbol for retransmitting a broadcast.

Accordingly, if a signal which has been once modulated to have 2 bits per symbol is demodulated, high order modulation unit 430 modulates the signal to have 4 bits per symbol.

Since the broadcast is modulated in consideration of the bandwidth of the frequency band for retransmitting the broadcast and the first bit rate, the broadcast can be retransmitted more effectively with limited frequency resources. A signal interruption, which may incur if a plurality of surrounding apparatuses receives a broadcast at the same time, can be prevented.

High order modulation unit 430 transmits the broadcast signal which has been modulated at the second bit rate in the second modulation method to multiplexing unit 440.

Mulitplexing unit 440 divides the broadcast, which has been modulated according to the second modulation method, into a plurality of channels using a TDM or a FDM method, and retransmits the broadcast which has been divided into the plurality of channels to the plurality of surrounding apparatuses through communication interface 380.

Figure 5:
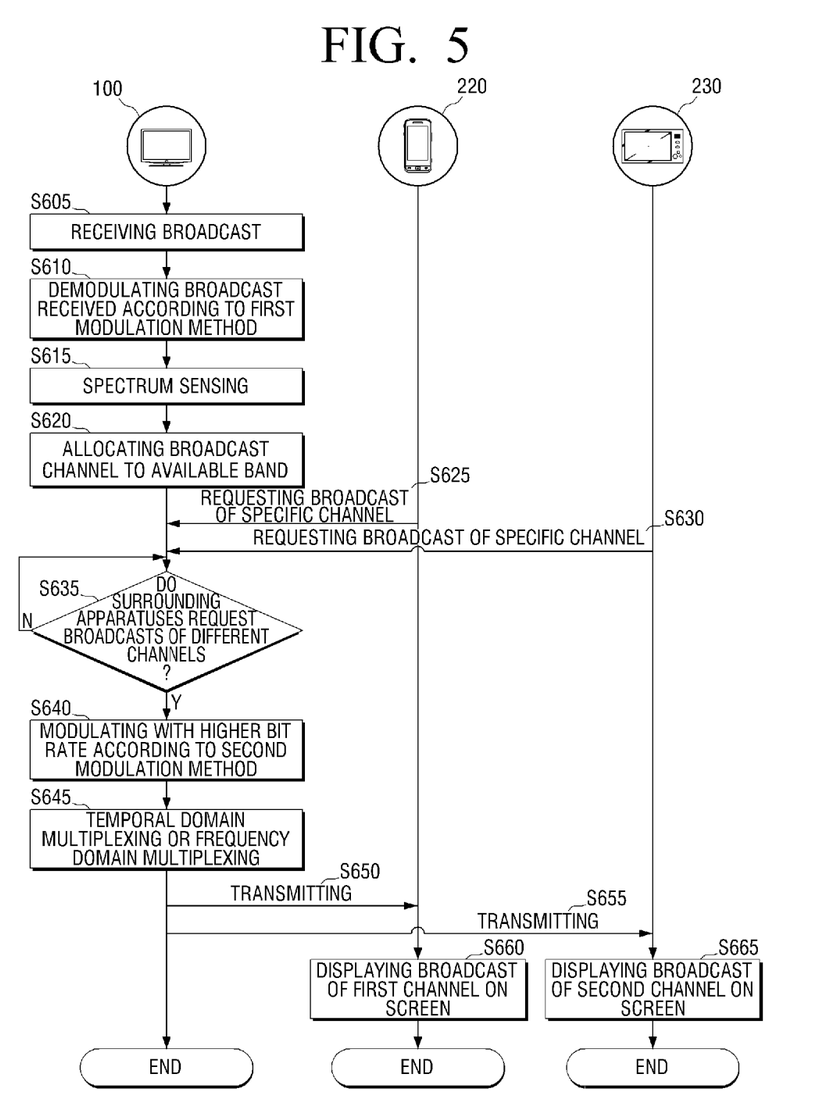
FIG. 5 is a flowchart illustrating a broadcast retransmitting method according to another exemplary embodiment.

FIG. 5 is a flowchart illustrating a broadcast retransmitting method according to another exemplary embodiment. The broadcast retransmitting method according to another exemplary embodiment receives a broadcast which has been modulated in a first modulation method from a broadcasting station or a satellite and demodulates the broadcast, and modulates the demodulated broadcast in a second modulation method and retransmits the broadcast to the plurality of surrounding apparatuses.

More specifically, host TV 100 receives a broadcast (S605). Host TV 100 receives a broadcast which has been modulated at a first bit rate in a first modulation method and demodulates it (S610).

Host TV 100 performs spectrum sensing with respect to an idle band among unauthorized bands to retransmit a broadcast, and searches for an available band (S615). If an available band is searched for, host TV 100 allocates a broadcast channel to the available band (S620).

If a request for a broadcast of a specific channel is received from mobile phone 220 and PMP 230 (S625, S630), host TV 100 determines whether or not mobile phone 220 and PMP 230 request broadcasts of different channels (S635). By modulating broadcasts of a plurality of channels at a higher bit rate according to whether or not the plurality of surrounding apparatuses request broadcasts of different channels, the occurrence of an error caused by broadcast transmission through a plurality of channels is reduced. In this embodiment, it is assumed that mobile phone 220 requests a broadcast of a first channel and PMP 230 requests a broadcast of a second channel.

Host TV 100 changes an original bit rate based on information regarding the bandwidth of the detected available band and information indicating that broadcasts of different channels are requested from two different surrounding apparatuses, and modulates the broadcast (S640). That is, if a band used for host TV 100 to receive a broadcast has a bandwidth "A," an available band for retransmitting a broadcast has a bandwidth "A/2," and a broadcast signal received from a broadcasting station or a satellite is modulated to have 2 bits per symbol, host TV 100 modulates the broadcast signal to have 8(2*2*2) bits per symbol.

Host TV 100 multiplexes broadcast signals of two channels in a temporal domain or a frequency domain (S645), and transmits them to mobile phone 220 and PMP 230, respectively (S650, S655).

Mobile phone 220 receives the broadcast of the first channel which is transmitted separately in the temporal domain or the frequency domain, and displays the broadcast on a screen (S660), and PMP 230 receives the broadcast of the second channel which is transmitted separately in the temporal domain or the frequency domain, and displays the broadcast on the screen (S665).

Making the modulation method for the broadcast received by the host TV 100 to be different from the modulation method for the broadcast received by the surrounding apparatus prevents an interruption in receiving a broadcast and occurrence of an error.

Hereinafter, a method for retransmitting a broadcast to a plurality of surrounding apparatuses through encoding will be described with reference to FIGS. 6 and 7.

Figure 6:
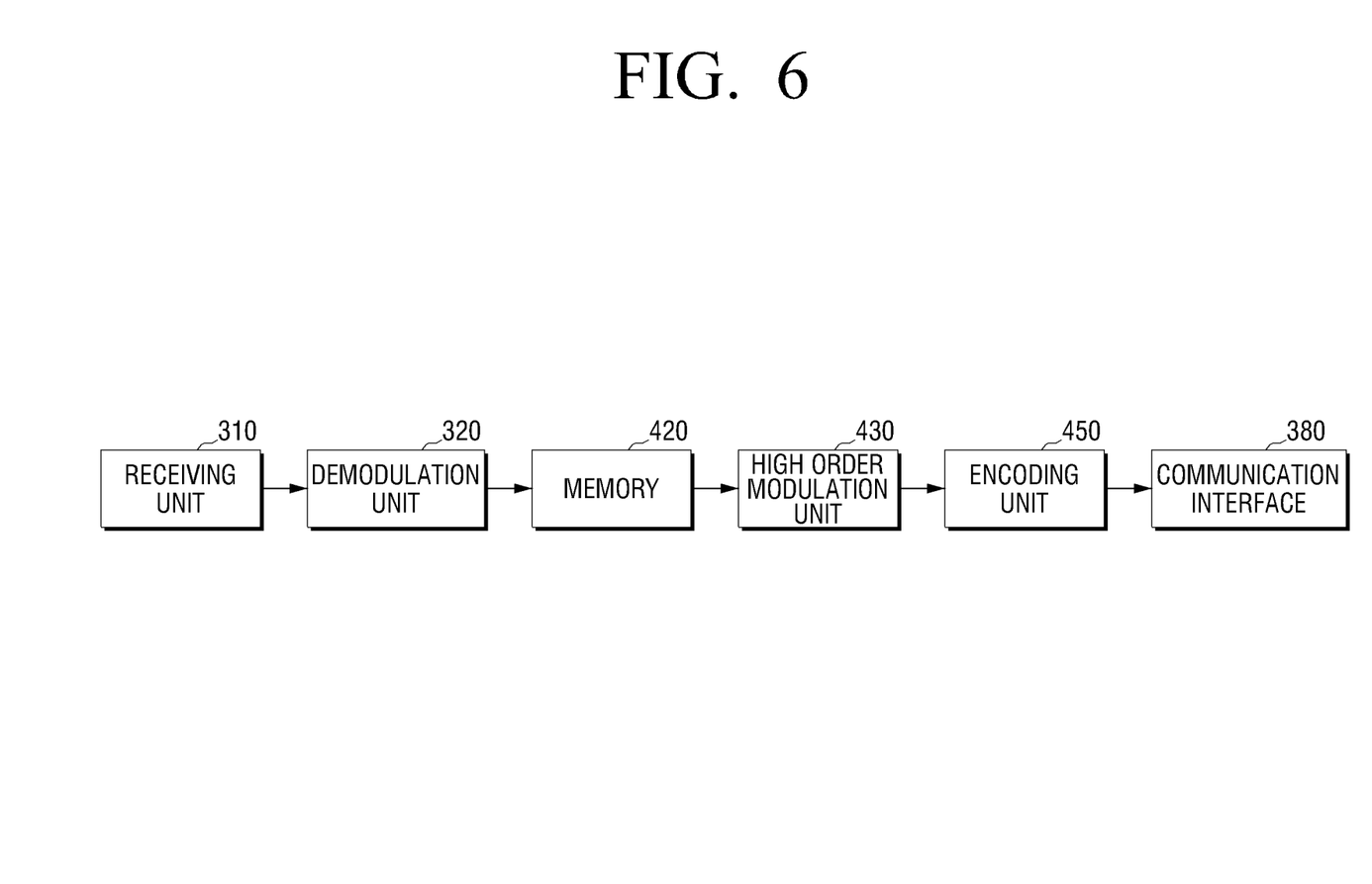
FIG. 6 is a block diagram illustrating a host TV according to still another exemplary embodiment.

FIG. 6 is a block diagram illustrating a host TV 100 according to still another exemplary embodiment. In particular, FIG. 6 is a block diagram illustrating a host TV 100 adopting a CDM method.

According to still another exemplary embodiment, host TV 100 demodulates and encodes a broadcast received from a broadcasting station or a satellite, and converts a bit rate and transmits the broadcast to surrounding apparatuses. In FIG. 6, some of components overlapping those of FIG. 2 are omitted and only components necessary for retransmitting a broadcast received from a broadcasting station or a satellite are described.

Host TV 100 according to still another exemplary embodiment includes a receiving unit 310, a demodulation unit 320, a memory 420, an encoding unit 450, a high order modulation unit 430, and a communication interface 380.

Receiving unit 310 receives a broadcast which has been modulated in a first modulation method from a broadcasting station or a satellite. The first modulation method is to modulate a broadcast at a first bit rate. For example, receiving unit 310 receives a broadcast signal which has been modulated to have 2 bits per symbol from a broadcasting station or a satellite. In this case, the first bit rate corresponds to 2 bits per symbol.

Receiving unit 310 receives the broadcast which has been modulated at the first bit rate, amplifies the received broadcast, and transmits the broadcast to demodulation unit 320.

Demodulation unit 320 demodulates the transmitted broadcast to extract a transport stream, and stores the extracted transport stream in memory 420.

High order modulation unit 430 extracts the transport stream from memory 420 and modulates the transport stream in a second modulation method which is different from the first modulation method.

High order modulation unit 430 transmits the broadcast signal which has been modulated at a second bit rate according to the second modulation method to encoding unit 450.

Encoding unit 450 encodes broadcast signals of channels requested by the surrounding apparatuses using respective unique orthogonal codes, which are allocated to the surrounding apparatuses and shared among the surrounding apparatuses, and combines the encoded broadcast signals.

Encoding unit 450 transmits the broadcast signals which have been encoded with the respective unique orthogonal codes and combined with one another to the plurality of surrounding apparatuses through communication interface 380.

Figure 7:
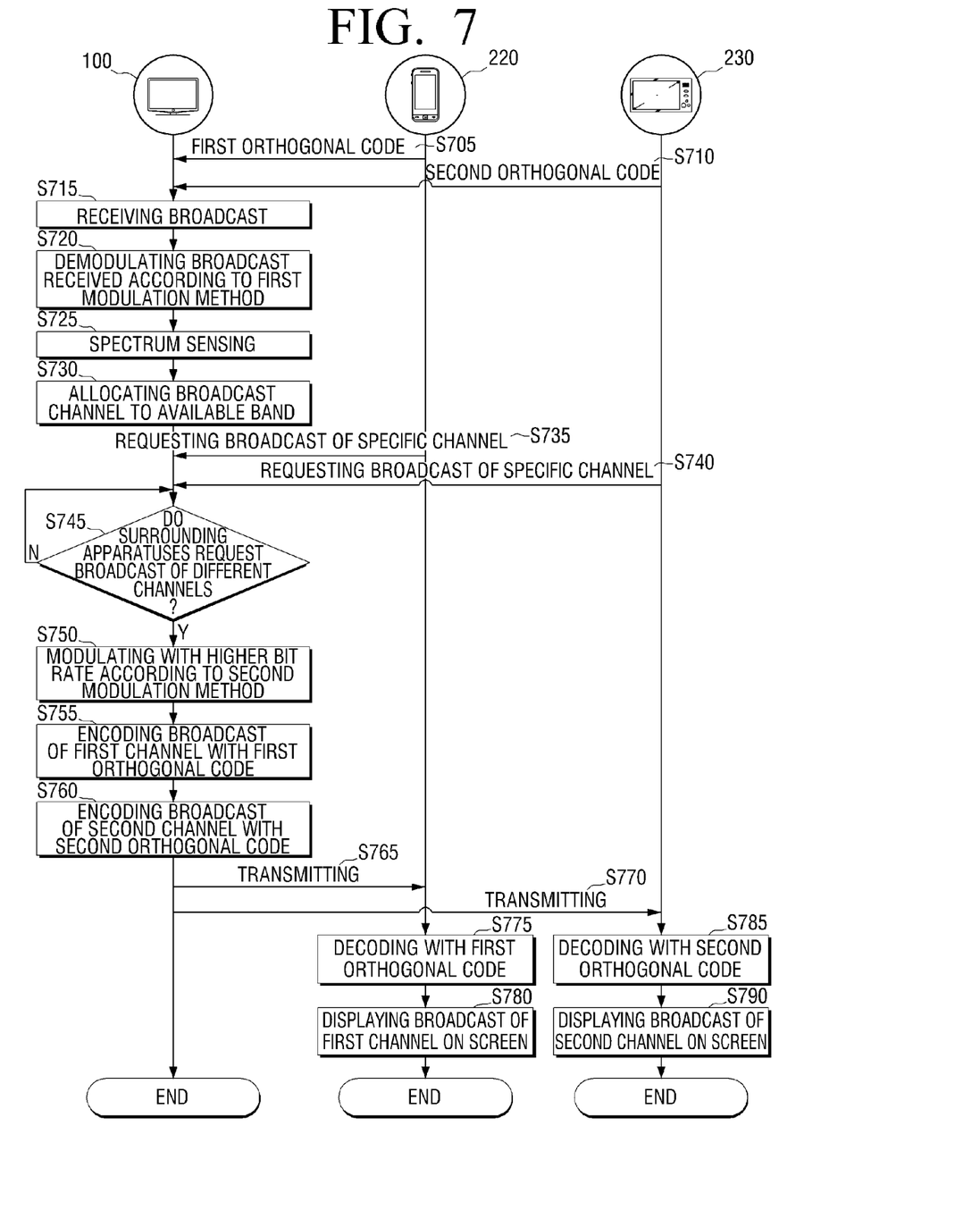
FIG. 7 is a flowchart illustrating a broadcast retransmitting method according to still another exemplary embodiment.

FIG. 7 is a flowchart illustrating a broadcast retransmitting method according to still another exemplary embodiment. The broadcast retransmitting method according to still another exemplary embodiment receives a broadcast which has been modulated in a first modulation method from a broadcasting station or a satellite and demodulates the broadcast, and modulates the demodulated broadcast in a second modulation method and retransmits the broadcast to a plurality of surrounding apparatuses.

In order to retransmit a broadcast, host TV 100 shares an orthogonal code which is allocated to each surrounding apparatus. That is, host TV 100 shares a first orthogonal code with mobile phone 220 (S705), and shares a second orthogonal code with PMP 230 (S710).

Host TV 100 receives a broadcast from a broadcasting station or a satellite (S715), and demodulates the broadcast which has been modulated at a first bit rate in a first modulation method (S720).

Host TV 100 performs spectrum sensing with respect to an idle band among unauthorized bands in order to retransmit a broadcast (S725) and searches for an available band. If an available band is searched for, host TV 100 allocates a broadcast channel to the available band (S730).

If a broadcast of a specific channel is requested by the mobile phone 220 and the PMP 230 (S735, S740), host TV 100 determines whether or not mobile phone 220 and PMP 230 request broadcasts of different channels (S745). By modulating broadcasts of a plurality of channels at a higher bit rate according to whether or not the plurality of surrounding apparatuses request broadcasts of different channels, the occurrence of an error caused by broadcast transmission through a plurality of channels is reduced. In this embodiment, it is assumed that mobile phone 220 requests a broadcast of a first channel and PMP 230 requests a broadcast of a second channel.

Host TV 100 modulates the broadcast signal at a bit rate which is two times higher than an original bit rate (S750). That is, if a broadcast signal received from a broadcasting station or a satellite has been modulated to have 2 bits per symbol, host TV 100 modulates the broadcast signal to have 4 bits per symbol.

Since two surrounding apparatuses request broadcast of different channels, host TV 100 encodes the broadcast of the first channel using the first orthogonal code (S755) and encodes the broadcast of the second channel using the second orthogonal code, and combines the encoded broadcast signals.

Host TV 100 transmits the broadcast signals which have been encoded with respective orthogonal codes and combined to the mobile phone 220 and PMP 230 (S765, S770).

Mobile phone 220 decodes the broadcast signal using the first orthogonal code shared with host TV 100 (S775), and displays the decoded first channel broadcast on a screen for a user (S780).

PMP 230 decodes the broadcast signal using the second orthogonal code shared with host TV 100 (S785) and displays the decoded second channel broadcast on a screen for the user (S790).

As described above, making the modulation method for the broadcast received by host TV 100 to be different from the modulation method for the broadcast received by the surrounding apparatus prevents an interruption in receiving a broadcast and occurrence of an error.

Figure 8:
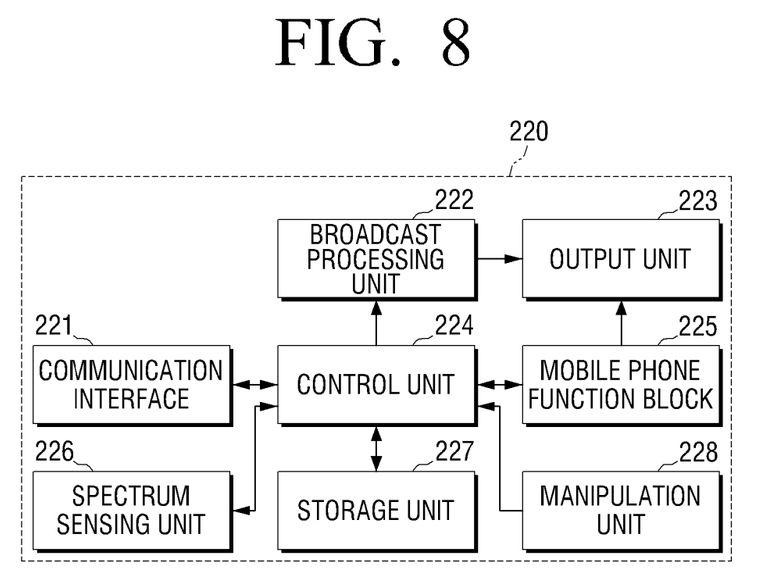
FIG. 8 is a block diagram illustrating a mobile phone according to an exemplary embodiment.

FIG. 8 is a block diagram illustrating mobile phone 220 described above. For convenience of explanation, FIG. 8 illustrates mobile phone 220 as a representative of the surrounding apparatus and the configurations of the other surrounding apparatuses such as TV 210 and PMP 230 can be inferred from that of the mobile phone 220. The other surrounding apparatuses merely represents an example of apparatuses to re-receive a broadcast in the home broadcasting system, The present inventive concept can be applied to a situation where the surrounding apparatuses are substituted with any other apparatus.

Mobile phone 220 includes a communication interface 221, a broadcast processing unit 222, an output unit 223, a control unit 224, a mobile phone function block 225, a spectrum sensing unit 226, a storage unit 227, and a manipulation unit 228.

Communication interface 221 operates as a means for communicating with host TV 100. In particular, communication interface 221 is used to re-receive a broadcast from host TV 100 through an available channel which is searched by spectrum sensing.

Broadcast processing unit 222 performs signal-processing with respect to a broadcast signal received from host TV 100 through communication interface 221. More specifically, broadcast processing unit 222 separates an audio signal and a video signal from the broadcast signal, decodes the audio signal to generate a decompressed audio signal, and converts the decoded audio signal to have an outputtable format. Also, broadcast processing unit 222 decodes the video signal to generate a decompressed video signal, and converts the decoded video signal to have an outputtable format.

Broadcast processing unit 222 transmits the audio signal and the video signal of the outputtable format to output unit 223.

Output unit 223 outputs the audio signal and the video signal output from broadcast processing unit 222. Output unit 223 receives a signal related to a mobile phone function from mobile phone function block 225, and outputs the signal.

Spectrum sensing unit 226 senses bands or channels within a predetermined frequency range in sequence, to find a band for retransmitting a broadcast. Also, spectrum sensing unit 226 selects, among the sensed bands, a broadcast received through a channel according to a user manipulation input through manipulation unit 228, and transmits the broadcast to control unit 224.

Mobile phone function block 225 processes the functions for performing an original operation of mobile phone 220.

Control unit 224 controls the overall operation of mobile phone 220. In particular, control unit 224 controls broadcast processing unit 222 to output the broadcast retransmitted through the communication interface to output unit 223, and provide the broadcast to the user.

Furthermore, control unit 224 controls spectrum sensing unit 226 to sense bands or channels within a predetermined frequency range in sequence and find a band for retransmitting a broadcast based on the sensing result. Control unit 224 selects a broadcast received through a channel according to a manipulation of manipulation unit 228 and outputs it to output unit 223.

Storage unit 227 stores diverse program information for operating mobile phone 220 and broadcast information received from host TV 100, and may be realized as a flash memory or a HDD.

Manipulation unit 228 transmits a user command to manipulate a channel, which is received from a button on mobile phone 220, to control unit 224, and control unit 224 controls the overall operation of mobile phone 220, according to the user command received from manipulation unit 228.

Figure 9:
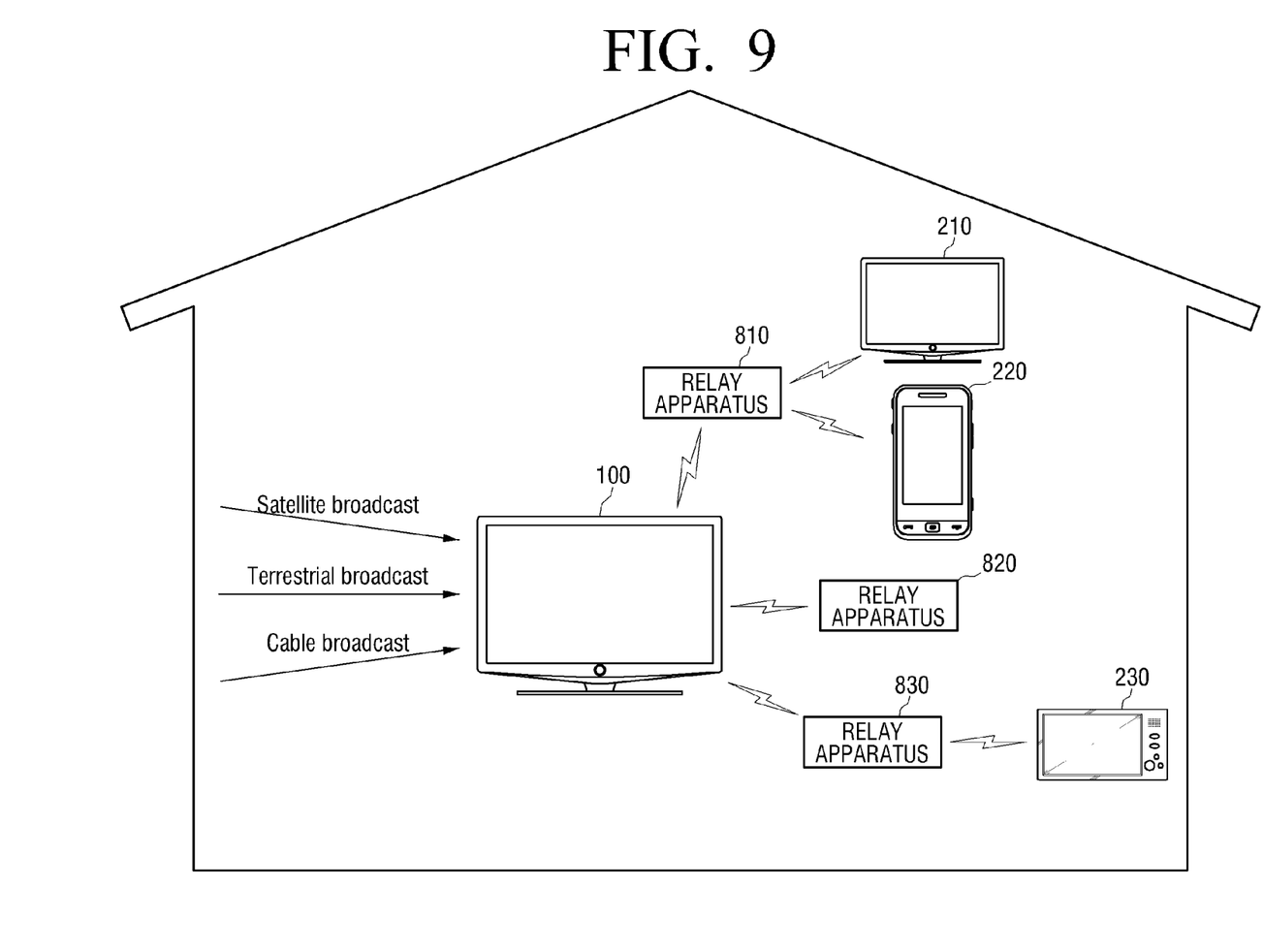
FIG. 9 is a block diagram illustrating a home broadcasting system according to another exemplary embodiment.

FIG. 9 is a view illustrating a home broadcasting system according to another exemplary embodiment. The home broadcasting system according to another exemplary embodiment includes a host apparatus to receive a broadcast and retransmit the broadcast, a relay apparatus to relay the retransmitted broadcast, and a surrounding apparatus to receive the retransmitted and related broadcast. In this embodiment, a host TV 100 is illustrated as a host apparatus, and a TV 210, a mobile phone 220, and a PMP 230 are illustrated as a surrounding apparatus.

Since host TV 100, TV 210, mobile phone 220, and PMP 230 are the same apparatuses that are described above or may be inferred from those described above, only a difference will be described.

Relay apparatuses 810, 820, 830 receive and amplify a broadcast signal which is retransmitted from host TV 100, and relays the amplified broadcast signal to surrounding apparatuses such as TV 210, mobile phone 220, and PMP 230.

Relay apparatuses 810, 820, 830 perform the same operation as that of host TV 100 described in the aforementioned exemplary embodiments. That is, relay apparatuses 810, 820, 830 receive a broadcast which has been modulated in a first modulation method from a broadcasting station or a satellite and demodulate it, and modulates the demodulated broadcast in a second modulation method and transmits it to the surrounding apparatuses.

More specifically, relay apparatuses 810, 820, 830 have the same configuration as that of FIG. 2, including receiving unit 310, demodulation unit 320, FEC decoder 330, FEC encoder 360, modulation unit 370, communication interface 380, control unit 400, and storage unit 410, and relays the broadcast signal to the surrounding apparatuses using a modulation method which is different from the modulation method already set, with respect to host TV 100.

If a modulation method used to exchange a broadcast signal between host TV 100 and relay apparatuses 810, 820, 830 are a QAM method, relay apparatuses 810, 820, 830 may use a PSK modulation method to exchange a broadcast signal with the surrounding apparatuses.

Relay apparatuses 810, 820, 830 may have the same configuration as that of FIG. 4, including receiving unit 310, demodulation unit 320, the memory 420, high order modulation unit 430, multiplexing unit 440, and communication interface 380, and may receive a broadcast which has been modulated at a first bit rate from host TV 100 and demodulate it, and modulate the broadcast at a second bit rate and transmit it to the surrounding apparatuses. For example, host TV 100 and relay apparatus 810 exchange a broadcast which has been modulated to have 2 bits per symbol with each other. As shown in FIG. 9, when relay apparatus 810 relays the broadcast signal to two surrounding apparatuses 210, 220, relay apparatus 810 relays the broadcast signal which has been modulated to have 4 bits per symbol to the surrounding apparatuses, and also, multiplexes the modulated broadcast signal in a temporal domain or a frequency domain and transmits to surrounding apparatuses 210, 220.

Relay apparatus 810, 820, 830 may have the same configuration as that of FIG. 6, including receiving unit 310, demodulation unit 320, memory 420, encoding unit 450, high order modulation unit 430, and communication interface 380, and may receive a broadcast which has been modulated at a first bit rate from host TV 100 and demodulates it, and modulate the broadcast at a second bit rate and transmit it to the surrounding apparatuses. Relay apparatus 810 shares orthogonal codes allocated to respective surrounding apparatuses 210, 220, and encodes the demodulated broadcast with a unique orthogonal code allocated to each surrounding apparatuses, modulates the broadcast, and relays it to the surrounding apparatuses.

Relay apparatuses 810, 820, 830 may be separate apparatuses located in a home to relay a broadcast, or some of the surrounding apparatus may be used as a relay apparatus.

The second bit rate is calculated based on the frequency bandwidth for retransmitting a broadcast and the first bit rate, as described above. However, this is merely an example for convenience of explanation, and the second bit rate is not necessarily determined by a function relationship between the two factors.

The second bit rate may be set to be higher than the first bit rate. This is because an available band width is not always fixed. If an available band is detected from an idle band through spectrum sensing, the available band is changeable but the amount of data used to transmit a broadcast on a real time basis is fixed. If the number of surrounding apparatuses increases, the amount of data that should be received per hour inevitably increases in order for a user to watch a desired broadcast, through the surrounding apparatus, without interruption.

Therefore, increasing the amount of data to be transmitted per hour in advance makes it possible to provide a broadcast to a user without interruption using data previously stored in the buffer even if the available bandwidth becomes narrow on the way of transmitting the broadcast and thus the amount of transmittable data decreases.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims. Many alternatives, modifications, and variations will be apparent to those skilled in the art.

What is claimed is:

1. A broadcast retransmitting apparatus comprising:
   a demodulation unit which receives a broadcast which has been modulated at a first rate according to a first modulation method from a broadcasting station or a satellite, and demodulates the broadcast received from the broadcasting station or the satellite;
   a modulation unit which modulates the demodulated broadcast according to a second modulation method different from the first modulation method;
   a spectrum sensing unit which detects an available band from an idle band through spectrum sensing for retransmitting the broadcast modulated according to the second modulating method; and
   a control unit which retransmits the broadcast modulated according to the second modulation method to a plurality of surrounding apparatuses using the detected available band,
   wherein the control unit allocates a broadcast channel to the available band, determines whether the plurality of surrounding apparatuses request broadcasts of different channels to the broadcast retransmitting apparatus, and controls the modulation unit to modulate the demodulated broadcast at a second rate higher than the first rate to reduce occurrence of an error caused by broadcast transmission through a plurality of channels if it is determined that the plurality of surrounding apparatuses request broadcasts of the different channels.

2. The broadcast retransmitting apparatus as claimed in claim 1, wherein the first modulation method is standardized with respect to the broadcasting station or the satellite to transmit the broadcast, and the second modulation method is set with respect to the surrounding apparatus by a user to retransmit the broadcast.

3. The broadcast retransmitting apparatus of claim 1, wherein the second modulation method is set by a user.

4. The broadcast retransmitting apparatus as claimed in claim 2, wherein, if the first modulation method is related to a single carrier transmission method, the second modulation method is related to a multi-carrier transmission method.

5. The broadcast retransmitting apparatus as claimed in claim 2, wherein, if the first modulation method is set to be one of a quadrature amplitude modulation (QAM) method, a phase shift keying (PSK) method, and a vestigial side bands (VSB) method, the second modulation method is set to be another one of the QAM method, the PSK method, and the VSB method.

6. The broadcast retransmitting apparatus as claimed in claim 1, wherein the modulation unit modulates the demodulated broadcast in the second modulation method based on a transmission environment for retransmitting the broadcast to the plurality of surrounding apparatuses.

7. The broadcast retransmitting apparatus as claimed in claim 6, further comprising a multiplexing unit which divides the broadcast, which has been modulated in the second modulation method, into at least one channel using at least one of a time division multiplexing (TDM) method, a frequency division multiplexing (FDM) method, and a code division multiplexing (CDM) method, and retransmits the broadcast to the plurality of surrounding apparatuses.

8. The broadcast retransmitting apparatus as claimed in claim 1, wherein the first modulation method is to modulate a broadcast with a first bit number per symbol, and the second modulation method is to modulate a broadcast with a second bit number per symbol.

9. The broadcast retransmitting apparatus as claimed in claim 8, wherein the second bit number is determined based on at least one of a frequency bandwidth for retransmitting the broadcast, the number of the surrounding apparatuses to re-receive the broadcast, and a transmission environment for retransmitting the broadcast.

10. A relay apparatus comprising:
    an amplification unit which receives, from a broadcast receiving apparatus, a broadcast which has been modulated at a first rate according to a first modulation method and has been received by the broadcast receiving apparatus from a broadcasting station or a satellite and amplifies the broadcast received from the broadcast receiving apparatus;
    a demodulation unit which demodulates the amplified broadcast;
    a modulation unit which modulates the demodulated broadcast according to a second modulation method different from the first modulation method; and
    a controller which relays the broadcast modulated according to the second modulation method to a plurality of surrounding apparatuses,
    wherein the controller allocates a broadcast channel to the available band, determines whether the plurality of surrounding apparatuses request broadcasts of different channels to the relay apparatus, and controls the modulation unit to modulate the demodulated broadcast at a second rate higher than the first rate to reduce occurrence of an error caused by broadcast transmission through a plurality of channels if it is determined that the plurality of surrounding apparatuses request broadcasts of the different channels.

11. The relay apparatus as claimed in claim 10, wherein the first modulation method is set with respect to the broadcast receiving apparatus to transmit the broadcast, and the second modulation method is set with respect to the surrounding apparatuses to retransmit the broadcast.

12. The relay apparatus according to claim 10, wherein the first and second modulation methods are set by a user.

13. A broadcast retransmitting method, comprising:
    receiving a broadcast which has been modulated at a first rate according to a first modulation method from a broadcast provider, demodulating the received broadcast and modulating the demodulated broadcast according to a second modulation method different from the first modulation method;

detecting an available band from an idle band through spectrum sensing; and retransmitting the broadcast which has been modulated according to the second modulation method to at least one of surrounding apparatuses using the detected available band, wherein the retransmitting comprises allocating a broadcast channel to the available band, determining whether the plurality of surrounding apparatuses request broadcasts of different channels to a broadcast retransmitting apparatus, and modulating the demodulated broadcast at a second rate higher than the first rate to reduce occurrence of an error caused by broadcast transmission through a plurality of channels if it is determined that the plurality of surrounding apparatuses request broadcasts of the different channels.

14. The broadcast retransmitting method as claimed in claim 13, wherein the first modulation method is standardized with respect to a broadcasting station or a satellite to transmit the broadcast, and the second modulation method is set with respect to the surrounding apparatuses to retransmit the broadcast.

15. The broadcast transmitting method of claim 13, wherein the second modulation method is set by a user.

16. The broadcast retransmitting method as claimed in claim 14, wherein, when the first modulation method is related to a single carrier transmission method, the second modulation method is related to a multi-carrier transmission method.

17. The broadcast retransmitting method as claimed in claim 14, wherein, when the first modulation method is set to be one of a QAM method, a PSK method, and a VSB method, the second modulation method is set to be another one of the QAM method, the PSK method, and the VSB method.

18. The broadcast retransmitting method as claimed in claim 13, wherein the modulating operation modulates the broadcast in the second modulation method, based on a transmission environment for retransmitting the broadcast to a plurality of surrounding apparatuses.

19. The broadcast retransmitting method as claimed in claim 18, wherein the retransmitting operation divides the broadcast, which has been modulated in the second modulation method, into at least one channel using at least one of a TDM method, a FDM method, and a CDM method, and retransmits the broadcast to the plurality of surrounding apparatuses.

20. The broadcast retransmitting method as claimed in claim 13, wherein the first modulation method is to modulate a broadcast with a first bit number per symbol, and the second modulation method is to modulate a broadcast with a second bit number per symbol.

21. The broadcast retransmitting method as claimed claim 20, wherein the second bit number is determined based on at least one of a frequency bandwidth for retransmitting the broadcast, the number of the surrounding apparatuses to re-receive the broadcast, and a transmission environment for retransmitting the broadcast.

22. A broadcast retransmitting system, comprising:

a host apparatus which receives a broadcast which has been modulated according to a first modulation method from a broadcasting station or a satellite;

a relay apparatus which receives the broadcast which has been modulated at a first rate according to the first modulation method from the host apparatus, demodulates the received broadcast, modulates the demodulated broadcast according to a second modulation method different from the first modulation method and retransmits the broadcast modulated according to the second modulation method; and a plurality of surrounding apparatuses which receive the retransmitted broadcast, and provides the received broadcast to a user, wherein the replay apparatus allocates a broadcast channel to the available band, determines whether the plurality of surrounding apparatuses request broadcasts of different channels to the relay apparatus, and controls the modulation unit to modulate the demodulated broadcast at a second rate higher than the first rate to reduce occurrence of an error caused by broadcast transmission through a plurality of channels if it is determined that the plurality of surrounding apparatuses request broadcasts of the different channels.

23. The broadcast retransmitting system as claimed in claim 22, wherein the relay apparatus amplifies the received broadcast.

* * * * *